(12) United States Patent
Kim

(10) Patent No.: US 9,447,946 B2
(45) Date of Patent: Sep. 20, 2016

(54) OPTICAL MEMBER AND METHOD FOR MANUFACTURING SAME, BACKLIGHT UNIT USING THE OPTICAL MEMBER, AND METHOD FOR MANUFACTURING THE BACKLIGHT UNIT

(75) Inventor: Joon-Hyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/881,119

(22) PCT Filed: Aug. 30, 2011

(86) PCT No.: PCT/KR2011/006404
§ 371 (c)(1),
(2), (4) Date: Apr. 23, 2013

(87) PCT Pub. No.: WO2012/064013
PCT Pub. Date: May 18, 2012

(65) Prior Publication Data
US 2013/0208451 A1 Aug. 15, 2013

(30) Foreign Application Priority Data

Nov. 10, 2010 (KR) .................. 10-2010-0111487
Aug. 26, 2011 (KR) .................. 10-2011-0085941

(51) Int. Cl.
*F21V 11/00* (2015.01)
*F21V 7/00* (2006.01)
*G02F 1/1335* (2006.01)

(52) U.S. Cl.
CPC .................. *F21V 11/00* (2013.01); *F21V 7/00* (2013.01); *G02F 1/133606* (2013.01); *G02F 1/133611* (2013.01); *Y10T 156/10* (2015.01)

(58) Field of Classification Search
CPC .................. G02F 1/133604; G02F 1/133608; G02F 1/133606; G02B 6/0038; G02B 6/0053; G02B 6/0036; G02B 6/0028; G02B 6/0068; G02B 6/0061; G02B 6/0051
USPC ....... 362/97.1, 606, 610, 615, 617, 618, 619
See application file for complete search history.

(56) References Cited

U.S. PATENT DOCUMENTS 5,384,658 A * 1/1995 Ohtake et al. ................ 359/707
6,650,382 B1 * 11/2003 Sumida et al. ................ 349/63

(Continued)

FOREIGN PATENT DOCUMENTS

CN        1656395       8/2005
JP        2010-020988   1/2010

(Continued)

*Primary Examiner* — Jong-Suk (James) Lee
*Assistant Examiner* — Mark Tsidulko
(74) *Attorney, Agent, or Firm* — Dentons US LLP

(57) ABSTRACT

The present invention relates to an optical member, comprising: a light incidence surface; and a light-emitting surface which comprises a patterned portion intended for adjusting the intensity of light and formed at an area corresponding to a light source, and an adhesive portion disposed in an area other than the patterned portion. When the optical member of the present invention is applied to a backlight unit, the patterned portion, which diffuses the light from the light source, is formed in the area corresponding to the light source so as to effectively diffuse the light from the light source into the peripheral area. Also, the optical member and a diffusion plate are stacked via an air layer in the area corresponding to the light source (the area in which the patterned portion is disposed), and the optical member and the diffusion plate closely contact each other without an air layer in the remaining area, such that the intensity of the light transmitted between a light source portion and the peripheral portion may be adjusted with an improvement in the balance of brightness and uniformity.

7 Claims, 5 Drawing Sheets

(56) References Cited

U.S. PATENT DOCUMENTS

| | | |
|---|---|---|
| 7,010,212 B2 | 3/2006 | Emmons et al. |
| 7,068,261 B2 * | 6/2006 | Kubo et al. .................... 345/173 |
| 7,344,618 B2 * | 3/2008 | Hannington ............... C09J 7/00 156/277 |
| 8,092,068 B2 * | 1/2012 | Parker et al. ................. 362/620 |
| 8,164,820 B2 * | 4/2012 | Cho et al. .................... 359/290 |
| 8,430,519 B2 * | 4/2013 | Takata ........................ 362/97.1 |
| 2003/0223216 A1 | 12/2003 | Emmons |
| 2004/0174594 A1 * | 9/2004 | Shikano ....................... 359/484 |
| 2008/0158472 A1 * | 7/2008 | Chung et al. ................. 349/60 |
| 2010/0033670 A1 * | 2/2010 | Fujita et al. ................. 349/158 |
| 2011/0163334 A1 * | 7/2011 | Krijn et al. .................... 257/88 |
| 2011/0205448 A1 | 8/2011 | Takata |
| 2011/0317099 A1 * | 12/2011 | Fuchida et al. ................ 349/64 |

FOREIGN PATENT DOCUMENTS

| | | |
|---|---|---|
| JP | 2010-091759 A | 4/2010 |
| JP | 2010-118240 | 5/2010 |
| JP | 2010-128447 A | 6/2010 |
| KR | 10-2005-0004238 | 1/2005 |
| KR | 10-2009-0100564 | 9/2009 |
| TW | 200405090 A | 4/2004 |
| WO | 2010035566 A1 | 1/2010 |

* cited by examiner

OPTICAL MEMBER AND METHOD FOR MANUFACTURING SAME, BACKLIGHT UNIT USING THE OPTICAL MEMBER, AND METHOD FOR MANUFACTURING THE BACKLIGHT UNIT

This application is a National Stage Entry of International Application No. PCT/KR 2011/006404, filed Aug. 30, 2011, and claims the benefit of Korean Application Nos. 10-2010-0111487 filed on Nov. 10, 2010, and 10-2011-0085941 filed Aug. 26, 2011 all of which are hereby incorporated by reference in their entirety for all purposes as if fully set forth herein.

TECHNICAL FIELD

The present invention relates to an optical member, and more particularly, to an optical member used for a backlight unit.

BACKGROUND ART

In general, a backlight unit used for a display device, such as a liquid crystal display (LCD), is a component disposed at the rear of a display panel having no light emitting function of its own so as to uniformly project planar light. The backlight unit may be classified as a direct type backlight unit or an edge type backlight unit, according to the position of a light source for emitting actual light. In the direct type backlight unit, light sources are disposed below a display panel and emit light therethrough, so that it is advantageous for a large-sized display. In the edge type backlight unit, a light source is disposed at the edge of a display panel so that it is advantageous for a thin, compact display.

FIG. 1 is a sectional view illustrating a configuration of a related art direct type backlight unit.

As shown in FIG. 1, the related art direct type backlight unit includes a plurality of light sources 120, a reflective plate 110, a light guide plate 130, a plurality of diffusion films 140 and 150, a condensing film 160, and a protective film 170.

Moreover, in the case of the related art direct type backlight unit, since the brightness at the right upper portions of the light sources and the brightness between the light sources are different, Mura defects may occur. As shown in FIG. 1, the plurality of diffusion films 140 and 150 are used to allow the light emitted from the light sources to diffuse across an entire plane, in order to prevent the Mura defects. However, due to the plurality of diffusion films, the manufacturing costs of the related art direct type backlight unit are high and its thickness is greater.

Moreover, in relation to the related art direct type backlight unit, since a plurality of optical films are stacked with a layer of air therebetween, light may be refracted at the interface between the optical film and the air layer. As a result, light transmittance may be deteriorated.

DISCLOSURE

Technical Problem

An aspect of the present invention provides an optical member for improving light diffusion in an area with a light source and preventing brightness deterioration caused by light reflection at the interface between areas with or without the light source and a method of manufacturing the optical member.

Another aspect of the present invention provides a backlight unit for improving light diffusion in an area with a light source and preventing brightness deterioration caused by light reflection at the interface between areas with or without the light source and a method of manufacturing the backlight unit.

Another aspect of the present invention provides a display device including a backlight unit.

Technical Solution

According to an aspect of the present invention, there is provided an optical member including: a light incident side; and a light outgoing side including a pattern part in an area corresponding to a light source and an adhesive part in an area aside from that of the pattern part, the pattern part adjusting the intensity of a light.

According to another aspect of the present invention, there is provided a backlight unit including: a light source; the optical member; and an optical film stacked on a light outgoing side of the optical member.

According to another aspect of the present invention, there is provided a method of manufacturing an optical member including operations of: (a) forming an adhesive part on a light outgoing side of an optical member; and (b) forming a non-adhesive pattern part to adjust the intensity of light in an area corresponding to a light source in the light outgoing side of the optical member.

According to another aspect of the present invention, there is provided a method of manufacturing a backlight unit including laminating an optical film for diffusion on the optical member manufactured through the above method.

Advantageous Effect

When an optical member according to embodiments of the present invention is applied to a backlight unit, a pattern part for diffusing the light of a light source is formed in an area corresponding to the light source, thereby effectively diffusing the light from the light source to a peripheral area. Additionally, a diffusion film is stacked on the optical member with an air layer therebetween in an area (in which the pattern part is formed) corresponding to the light source, but the optical member and the diffusion film contact with no air layer in the remaining area except for the corresponding area, so that the intensity of a light transmitted between the light source and the peripheral area is balanced, thereby improving brightness uniformity.

SYMBOL DESCRIPTION

Figure 1:
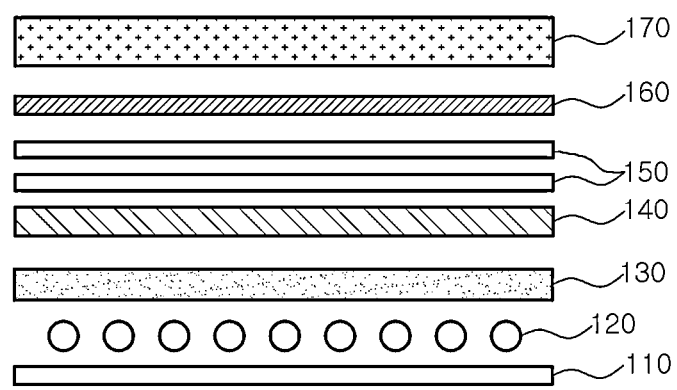
FIG. 1 is a schematic sectional view illustrating a configuration of a related art direct type backlight unit.

- 110 Reflective plate
- 120 Light source
- 130 Light guide plate
- 140 Diffusion film
- 150 Microlens diffusion film
- 160 Prism sheet
- 170 Protective film
- 200 Optical member
- 212 Light incident side
- 214 Light outgoing side
- 220 Pattern part
- 230 Adhesive part
- 240 Spacer
- 300 Air layer
- 400 Upper optical film
- A Area having reflective pattern

BEST MODE

Exemplary embodiments of the present invention will now be described in detail with reference to the accompanying drawings.

However, since the present invention may have various modifications and diverse embodiments, only specific embodiments are exemplarily illustrated in the drawings and will be described in detail. However, the present invention should not be construed as being limited to the specific embodiments set forth herein but, rather, it is intended that the present invention cover all modifications, equivalents, and substitutions within the ideas and technical scope of the present invention. Like reference numerals refer to like elements throughout the drawings.

Figure 2:
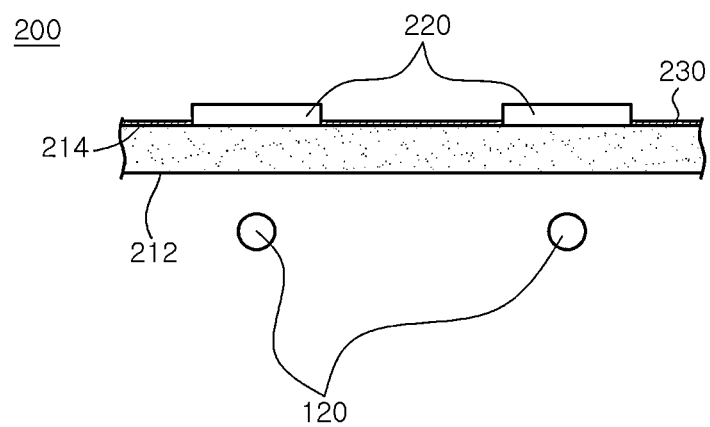
FIG. 2 is a view illustrating a configuration of an optical member according to an embodiment of the present invention.

FIG. 2 is a view illustrating a configuration of an optical member according to an embodiment of the present invention. The optical member 200 shown in FIG. 2 includes a light incident side 212, a light outgoing side 214, a pattern part 220, and an adhesive part 230.

The light incident side 212 in the optical member 200 faces a light source 120 and is a side to which the light from the light source 120 is incident and the light outgoing side 214 faces an upper film and is a side emitting the light from the light source 120 to the upper film.

Since the optical member 200 serves as a light guide plate transmitting the light from the light source 120 to diffuse to the front side, it is formed of a film or a sheet, which may transmit light. For example, the optical member may be formed of acrylic resin (ex.: Polymethylmethacrylate (PMMA)), cellulose resin (ex.: Tri-acetyl cellulose), and polyester resin (ex.: Polyethylene Terephthalate) but is not specially limited thereto. Moreover, the optical member 200 may use an adhesive resin to effectively form the adhesive part 230. For example, the optical member 200 may be formed of acrylic resin, urethane resin, vinyl resin, or silicon resin but is not specially limited thereto.

The pattern part 220 is formed in an area corresponding to the light source 120. The reason for forming the pattern part in a predetermined area corresponding to the light source is to prevent the light from the light source, transmitted through the right upper portion of the light source, and also effectively diffuse the light to a peripheral area.

In more detail, the pattern part 220 is formed in a predetermined area, on the basis of an area corresponding to the light source 120 in the light incident side 214 of the optical member. Its size may be determined according to the arrangement or size of the light source. Specifically, the pattern part 220 may be formed to have an oval outline (that is, its major axis may be about 6 mm to about 60 mm and its minor axis may be about 5 mm to about 45 mm), on the basis of the light source 120, and may more preferably be formed with an oval outline (that is, its major axis may be about 10 mm to about 30 mm and its minor axis may be about 7 mm to about 20 mm). However, if a plurality of light emitting devices (LEDs) are used and the distance between the LEDs is less than the above size, diffusion pattern parts corresponding to each LED may overlap and be formed larger than detailed above.

Additionally, the pattern part 220 may be formed through an inkjet printing method. Since the inkjet method may be used to form a pattern in a non-contact manner, it is advantageous in forming a pattern on an adhesive light incident side of the optical member.

Furthermore, an ink used for forming the pattern part 220 may be a non-adhesive ink. This is because the pattern part 220 is to have no adhesiveness, while other areas aside from that of the pattern part are to have adhesiveness.

Additionally, thickness of the ink of the pattern part 220 may vary according to an amount of a pigment component in the ink and, when an inkjet is used for printing, a pattern of about 0.2 μm to about 15 μm high is typically formed. Moreover, when an inkjet is used for printing, the desired degree of light diffusion may be controlled by adjusting an input amount of a pigment to an ink to be within the above range.

Moreover, the pattern part 220 has a pattern for preventing and diffusing light and adjusts the intensity of a light passing through the optical member 200 by using the pattern. In more detail, the pattern part 220 may include at least one of a reflective pattern for reflecting the light from the light source to reduce an amount of transmitted light and a diffusion pattern for diffusing the light from the light source into a peripheral area. Here, the reflective pattern may be formed of an ink including at least one selected from the group consisting of Al, Cr, Ag, Hg, Pt, and Mo. Here, Al, Cr, Ag, Hg, Pt, and Mo may serve to reflect light. Also, the diffusion pattern may be formed of an ink including at least one selected from the group consisting of titanium dioxide, Teflon, polystyrene, and silica. Here, titanium dioxide, Teflon, polystyrene, and silica may serve to diffuse light.

Figure 3:
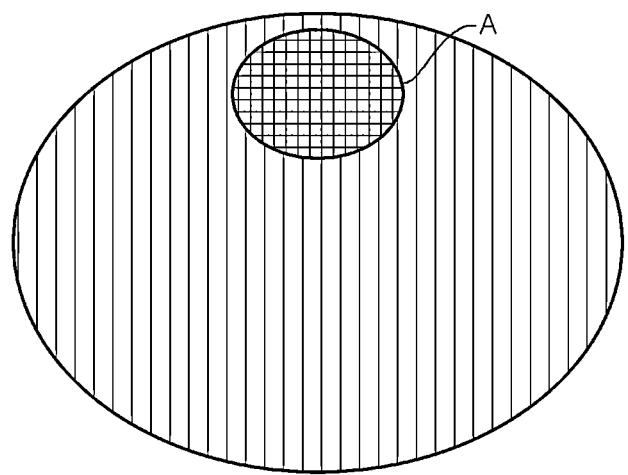
FIG. 3 is a schematic view illustrating a pattern formed on a pattern part of an optical member according to an embodiment of the present invention.

FIG. 3 is a schematic view illustrating a pattern formed on the pattern part 220 of the optical member 200 according to an embodiment of the present invention. In more detail, FIG. 3 illustrates a pattern including both a reflective pattern and a diffusion pattern.

Referring to FIG. 3, when both the reflective pattern and the diffusion pattern are formed on the pattern part 220, a diffusion pattern is formed on an entire area of the pattern part 220 and the reflective pattern is formed on the upper middle portion A over the diffusion pattern, in order to form the pattern part.

The adhesive part 230 is formed in an area aside from that of the pattern part 220. This is because an area having the pattern part 220, i.e., a portion corresponding to the light source, and a film stacked on the optical member have an air layer therebetween and adhesiveness is provided only on an area aside from that of the pattern part, so that the optical member and the film stacked thereon may contact each other with no air layer (refer to FIG. 5).

That is, an air layer is formed between the optical member 200 and an optical film 400 thereon in an area having the optical light therebelow to diffuse light, thereby reducing the intensity of the light. Additionally, the optical member 200 and the optical film 400 thereon contact each other with no air layer therebetween, to minimize the light refracted at the interface in an area having no optical light therebelow, thereby minimizing light loss. As a result, brightness uniformity can be improved.

The light source 120 may be any light source typically used in a backlight unit. For example, the light source may include an LED, a Cold Cathode Fluorescene Lamp (CCFL), and an External Electrode Fluorescent Lamp (EEFL). Moreover, the light source 120 is disposed below the optical member 200 as shown in FIG. 2, but is not limited thereto. For example, the light source 120 may be built in the optical member 200.

Additionally, the adhesive part 230 may be formed by patterning a predetermined area with a non-adhesive ink in the adhesive light outgoing side 214 of the optical member or by patterning a predetermined area with a non-adhesive ink after coating an adhesive on the non-adhesive light outgoing side 214 of the optical member.

Figure 4:
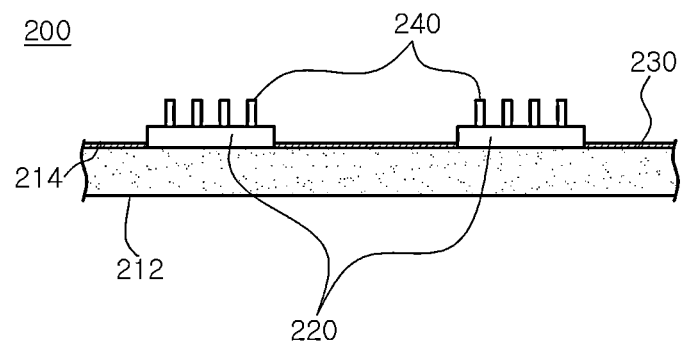
FIG. 4 is a view illustrating a configuration of an optical member according to another embodiment of the present invention.

FIG. 4 is a view illustrating a configuration of an optical member according to another embodiment of the present invention.

As shown in FIG. 4, the optical member 200 may further include a spacer 240 on the pattern part 220. The spacer 240 serves to maintain a predetermined interval between the pattern part 220 and the optical film 400 stacked thereon. The spacer 240 may be formed through a method of forming an overlapping pattern by using an ink. This formed spacer may have a pillar structure. Additionally, the ink used for forming the spacer 240 may be an ultraviolet curing ink or a phase change ink. The reason is that the ultraviolet curing ink or the phase change ink may minimize a diffusion phenomenon on the surface of a substrate. When the ultraviolet curing ink or the phase change ink is used for forming an overlapping pattern (i.e., the spacer 240), the height of the overlapping pattern (i.e., the height of the spacer 240) may be several tens of µm.

Figure 5:
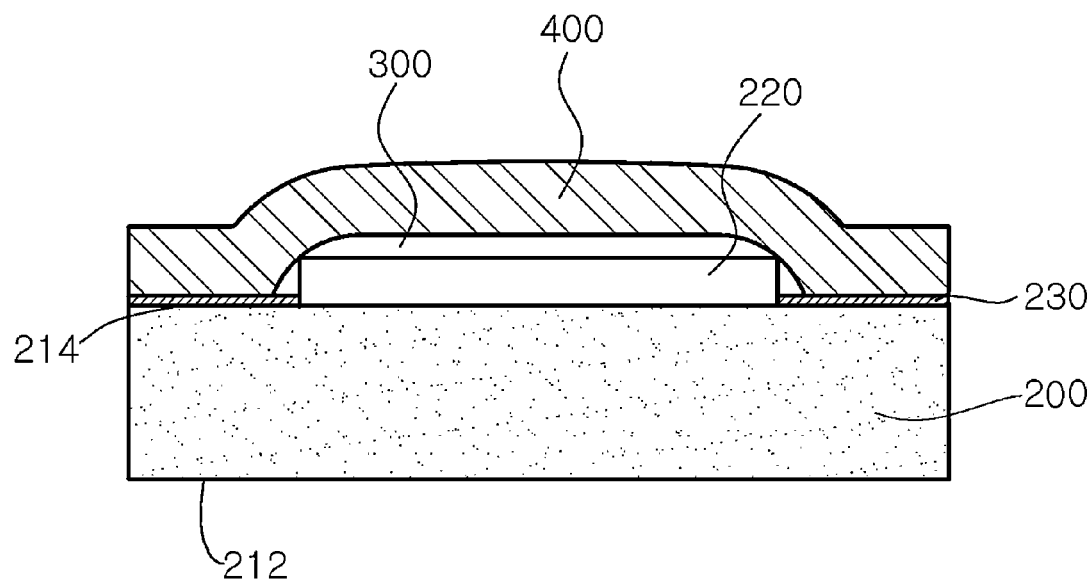
FIG. 5 is a view illustrating a structure in which an optical film is stacked on an optical member according to an embodiment of the present invention.

FIG. 5 is a view illustrating a structure in which an optical film is stacked on an optical member according to an embodiment of the present invention.

When the optical film 400 is stacked on the optical member 200, as shown in FIG. 5, an air layer 300 is formed between the pattern part 220 and the optical film 400 stacked thereon and no air layer is formed between the adhesive part 230 and the optical film 400 stacked thereon, thereby adhering the adhesive part 230 to the optical film 400 with no air layer. Since the pattern part 220 is non-adhesive, the pattern part 220 and the optical film 400 stacked thereon are not adhered to each other and, due to this, the air layer 300 is formed therebetween. And, since the adhesive part 230 is adhesive, the adhesive part 230 and the optical film 400 stacked thereon contact with no air layer 300.

Moreover, as shown in FIG. 5, the air layer 300 is formed only in an area corresponding to the light source 120. This is because the pattern part 220, i.e., an area having the air layer 300, is formed in an area corresponding to the light source 120.

That is, when the optical film 400 is stacked on the optical member 200, the air layer is interposed therebetween in an area having the light source 120 therebelow in the optical member 200, and the optical film 400 contacts the optical member 200 in an area 230 having no light source 120 therebelow, with no air layer. Here, the optical film 400 may be a light diffusing film.

According to the above structure, a light is refracted at the interface between the air layer and the optical film 400 to reduce an amount of light transmitted from the pattern part 220 where a large amount of light is transmitted due to the light source 120 therebelow. Since there is no air layer in the area 230 having no light source 120 therebelow, light is not refracted at the interface to minimize the loss of transmitted light, so that the transmitted light is uniformly distributed on an entire plane.

Figure 6:
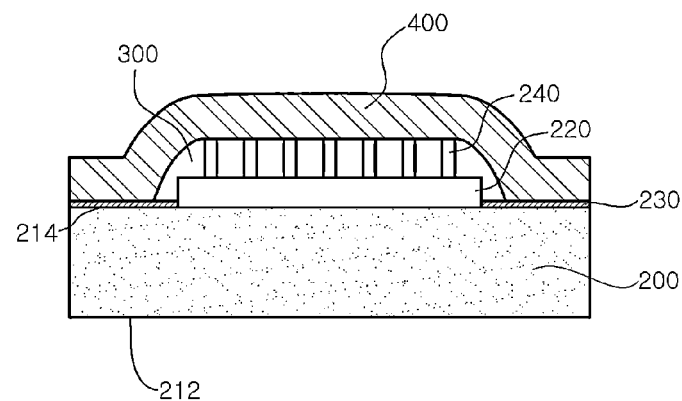
FIG. 6 is a view illustrating a structure in which an optical film is stacked on an optical member according to another embodiment of the present invention.

FIG. 6 is a view illustrating a structure in which an optical film is stacked on an optical member according to another embodiment of the present invention.

Referring to FIG. 6, since the pattern part 220 of the optical member 200 includes the spacer 240, the upper optical film 400 may be stacked on the pattern part 220 with the air layer 300 of a predetermined area due to the spacer 240. Additionally, since the interval between the optical member 200 and the upper optical film 400 is adjusted by controlling the height of the spacer 240, the most appropriate structure for effectively diffusing the light from the light source 120 in an area corresponding to the light source 120 and uniformly providing brightness in an entire plane may be selected.

An optical member according to the embodiment of the present invention may be applied to a direct type backlight unit but may be also applied to an edge type backlight unit. In the edge type backlight unit, the optical member is applied to the interface between a light source and an optical member to increase brightness uniformity A method of manufacturing an optical member according to an embodiment of the present invention includes operations of: (a) forming an adhesive part on an light outgoing side of an optical member; and (b) forming a pattern part in a predetermined area of the light outgoing side of the optical member.

Here, the pattern part in (b) is an area corresponding to a light source. This is for effectively preventing and diffusing the light from the light source to a peripheral area, with an optical pattern in a predetermined area corresponding to the light source.

Additionally, the pattern part in (b) may be non-adhesive. This is for effectively diffusing the light from the light source to a peripheral area by stacking an upper film on the non-adhesive pattern part with an air layer therebetween only in an area corresponding to the light source.

That is, an adhesive part is formed on the light outgoing side of the optical member and then a non-adhesive pattern part is further formed on an area of the light outgoing side corresponding to the light source, so that the adhesive part contacts a film stacked thereon with no air layer therebetween and the film is stacked on the pattern part with an air layer therebetween.

Additionally, (b) may be performed through an inkjet printing method. Since the inkjet method is used for forming a pattern in a non-contact manner, it is advantageous in forming a pattern on the adhesive light outgoing side of the optical member.

Additionally, (b) may be performed using a non-adhesive ink.

Additionally, the pattern part in (b) may include at least one of a reflective pattern for reflecting the light from the light source and a diffusion pattern for diffusing the light from the light source into a peripheral area. The reflective pattern reflects the light from the light source to reduce an amount of light transmitted at the right upper portion of the light source and the diffusion pattern diffuses the light from the light source to a peripheral area to provide a uniform distribution of the light across an entire plane. Here, the reflective pattern may be formed of an ink including at least one selected from the group consisting of Al, Cr, Ag, Hg, Pt, and Mo. Here, Al, Cr, Ag, Hg, Pt, and Mo serve to reflect light. Also, the diffusion pattern may be formed of an ink including at least one selected from the group consisting of titanium dioxide, Teflon, polystyrene, and silica. Here, titanium dioxide, Teflon, polystyrene, and silica serve to diffuse light.

Additionally, the manufacturing method of an optical member may further include operations of (c) forming a spacer on a portion of the pattern part of (b) to maintain a predetermined interval between the portion and a film stacked thereon. Here, the spacer may be formed by overlapping an ink for patterning and a pillar-shaped structure may be formed through the overlapping ink. In order to form the spacer, the ink for patterning may be an ultraviolet curing ink or a phase change ink, which minimizes diffusion phenomenon on a base surface.

A method of manufacturing a backlight unit using the optical member formed through the above method includes laminating a diffusion film on the optical member. That is, the diffusion film is laminated on the optical member through roll pressing. As a result, an area having an adhesive thereon except for a pattern part contacts the diffusion film with no air layer and the pattern part has a structure in which the diffusion film does not contact the pattern part due to a spacer. That is, the diffusion film is stacked on the pattern part with an air layer therebetween. Since the pattern part is formed only in a predetermined area corresponding to the light source, the diffusion film is stacked on the area corresponding to the light source of the optical member with an air layer therebetween and the remaining areas contact with no air layer. Due to this structure, a light is refracted at the interface between the air layer and the diffusion film in an area having a light source therebelow to reduce an amount of transmitted light and a light is not refracted at the interface in an area having no light source to minimize the loss of transmitted light. As a result, brightness uniformity can be improved.

MODE FOR INVENTION

Hereinafter, the present invention will be described in more detail through an example.

Example

1. Manufacturing Optical Member

A sheet formed of Polymethylmethacrylate (PMMA) acrylic resin was used as an optical member and a sheet formed of acrylic adhesive resin was attached to the surface of the optical member.

A pattern part was formed in a predetermined area corresponding to a light source in an optical outgoing side of the optical member having the adhesive resin sheet attached thereto through an inkjet method.

The pattern part had an oval outline (that is, its major axis is about 20 mm and its minor axis is about 15 mm, based on the light source) and its inside had a fine optical pattern obtained by adjusting the density of an ink droplet shot by an inkjet. In more detail, the optical pattern included a reflective pattern formed using a non-adhesive ink containing Ag nano-particles and a diffusion pattern formed using a non-adhesive white ultraviolet curing ink containing titanium dioxide.

The white ultraviolet curing ink was printed and overlapped on a portion of the pattern part to form spacers, each having a pillar structure (that is, heights of about 50 $\mu$m and diameters of about 100 $\mu$m). Several hundreds of the spacers may be formed and their outer diameters may be spaced about 0.2 mm apart from each other. Then, ultraviolet light rays were projected to cure the pattern part.

2. Manufacturing Backlight Unit

A diffusion film was laminated on the optical member manufactured through the above method during roll pressing. As a result, the diffusion film contacted an area having a remaining adhesive except for the pattern part with no air layer and the pattern part had a structure in which it was not in contact with the diffusion film due to the spacer and the diffusion film being stacked on the pattern part with an air layer therebetween. The backlight unit having the above structure reduced the brightness difference between an area corresponding to the light source and an area except for the corresponding area and also conceals the light source. Moreover, light was uniformly distributed across an entire area.

Comparative Example 1

1. Manufacturing Optical Member

A sheet formed of Polymethylmethacrylate (PMMA) acrylic resin was used as an optical member. Except for the fact that an adhesive resin was not attached to the surface of the optical member and a light diffusion pattern was not formed, this was identical to the embodiment of the present invention.

2. Manufacturing Backlight Unit

A diffusion film was laminated on the optical member manufactured through the above method during roll pressing. As a result, the diffusion film was stacked on the optical member with an air layer therebetween.

Comparison Example 2

1. Manufacturing Optical Member

A sheet formed of Polymethylmethacrylate (PMMA) acrylic resin was used as an optical member and a pattern part is formed on a predetermined area corresponding to a light source in a light outgoing side of the optical member. That is, except for the fact that an adhesive resin was not attached to the surface of the optical member, this was identical to the embodiment.

2. Manufacturing Backlight Unit

A diffusion film is laminated on the optical member manufactured through the above method during roll pressing. As a result, the diffusion film is stacked on the optical member with an air layer therebetween.

Figure 7:
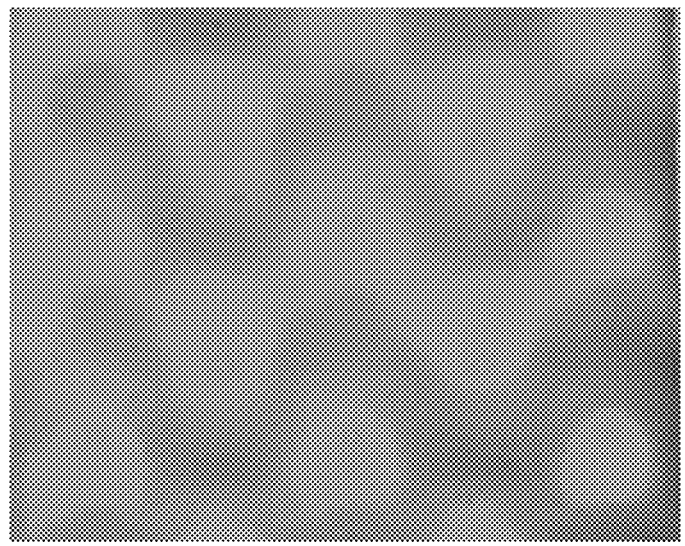
FIG. 7 is a picture taken above the backlight unit according to the example of the present invention and illustrating the degree of uniform brightness of the backlight unit according to the example of the present invention.
Figure 8:
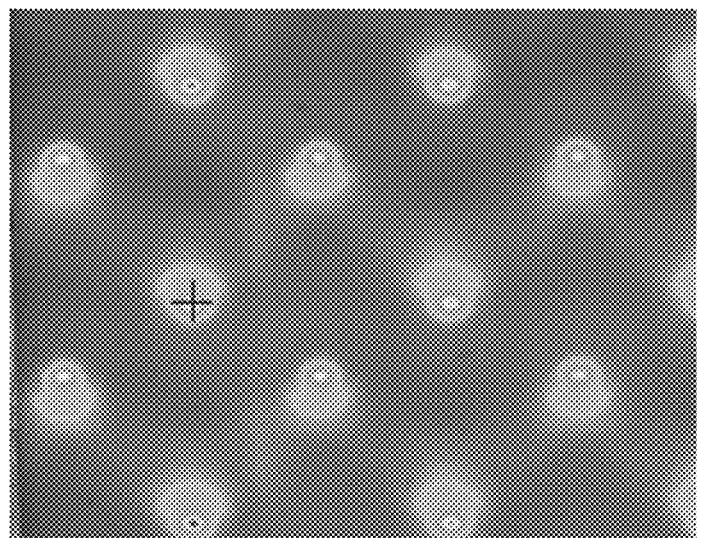
FIG. 8 is a picture taken above the backlight according to the comparison example 1 of the present invention and illustrating the degree of uniform brightness of the backlight unit according to the comparison example 1 of the present invention.
Figure 9:
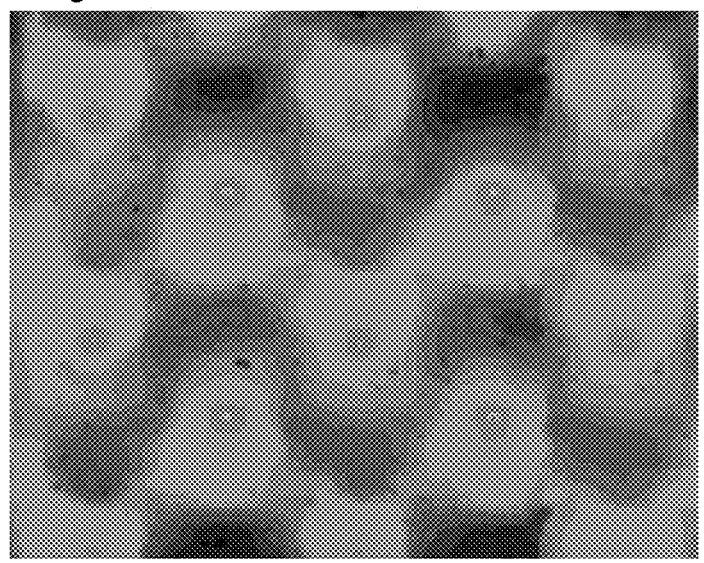
FIG. 9 is a picture taken above the backlight according to the comparison example 2 of the present invention and illustrating the degree of uniform brightness of the backlight unit according to the comparison example 2 of the present invention.

FIG. 7 is a picture taken above the backlight unit according to the example of the present invention. FIG. 8 is a picture taken above the backlight according to the comparison example 1 of the present invention. FIG. 9 is a picture taken above the backlight according to the comparison example 2 of the present invention. The brightness uniformities of the backlights are shown in FIGS. 7 to 9.

When brightness uniformities of the backlight units according to the example and the comparison examples were compared with reference to FIGS. 7 to 9, the backlight unit according to the embodiment had better uniform light distribution in an overall area, better concealment of the light source, and better brightness uniformity than the backlight units according to the comparative examples 1 and 2.

The invention claimed is:

1. An optical member comprising:
   a light incident side;
   a light outgoing side comprising a pattern part in an area corresponding to a light source and an adhesive part in an area aside from that of the pattern part, the pattern part configured to adjust the intensity of a light, the pattern part formed of a non-adhesive ink; and
   a spacer formed on the pattern part and having a pillar structure in order to maintain a predetermined distance between the pattern part and a film stacked thereon,
   wherein the spacer is formed by overlapping and patterning an ultraviolet curing ink or a phase change ink;
   wherein the pattern part includes a diffusion pattern formed on an entire area of the pattern part and a reflective pattern formed over the diffusion pattern,
   wherein the diffusion pattern is formed of a non-adhesive ink comprising at least one selected from the group consisting of titanium dioxide, Teflon, polystyrene, and silica, and
   wherein the reflective pattern is formed of a non-adhesive ink comprising at least one selected from the group consisting of Al, Cr, Ag, Hg, Pt, and Mo.

2. The optical member of claim 1, wherein the pattern part is formed through an inkjet method.

3. A backlight unit comprising:
   a light source;
   the optical member of claim 1; and
   an optical film stacked on a light outgoing side of the optical member.

4. The backlight unit of claim 3, wherein an air layer is formed between a pattern part of the optical member and the optical film; and
   an adhesive part of the optical member and the optical film contact each other with no air layer.

5. A display device comprising the backlight unit of claim 4.

6. A method of manufacturing an optical member including operations of:
   (a) forming an adhesive part on a light outgoing side of an optical member;
   (b) forming a non-adhesive pattern part using a non-adhesive ink to adjust the intensity of light in an area corresponding to a light source in the light outgoing side of the optical member; and
   (c) forming a spacer on the pattern part having a pillar structure in order to maintain a predetermined interval between a portion of the pattern part of (b) and a film stacked thereon,
   wherein the spacer is formed by overlapping and patterning an ultraviolet curing ink or a phase change ink,
   wherein the pattern part includes a diffusion pattern formed on an entire area of the pattern part and a reflective pattern formed over the diffusion pattern,
   wherein the diffusion pattern is formed of a non-adhesive ink comprising at least one selected from the group consisting of titanium dioxide, Teflon, polystyrene, and silica, and
   wherein the reflective pattern is formed of a non-adhesive ink comprising at least one selected from the group consisting of Al, Cr, Ag, Hg, Pt, and Mo.

7. A method of manufacturing a backlight unit comprising laminating an optical film for diffusion on the optical member manufactured through the method of claim 6.

* * * * *